(12) United States Patent
Kajita et al.

(10) Patent No.: US 6,439,072 B1
(45) Date of Patent: Aug. 27, 2002

(54) BALL SCREW

(75) Inventors: Toshiharu Kajita; Takayuki Yabe; Hideyuki Sato, all of Gunma (JP)

(73) Assignee: nNSK Ltd., Tokyo (JP)

( * ) Notice: Subject to any disclaimer, the term of this patent is extended or adjusted under 35 U.S.C. 154(b) by 0 days.

(21) Appl. No.: 09/313,999

(22) Filed: May 19, 1999

(30) Foreign Application Priority Data

Jun. 30, 1998 (JP) ............................................ 10-184452

(51) Int. Cl.[7] ........................... F16H 27/02; F16H 29/02
(52) U.S. Cl. ........................ 74/89.23; 384/43; 384/49; 74/89.32
(58) Field of Search ........................ 74/459, 492, 493, 74/89.23, 89.32, 89.29, 89.3; 384/7, 45, 49, 43

(56) References Cited

U.S. PATENT DOCUMENTS

| | | | |
|---|---|---|---|
| 2,770,155 A | | 11/1956 | Morgan |
| 4,303,281 A | * | 12/1981 | Irby ............................. 308/10 |
| 4,526,380 A | * | 7/1985 | Raj et al. ....................... 277/80 |
| 4,628,384 A | * | 12/1986 | Raj et al. ....................... 360/97 |
| 5,735,048 A | * | 4/1998 | Peters ...................... 29/898.045 |
| 5,882,122 A | * | 3/1999 | Noguchi et al. ............ 384/490 |

FOREIGN PATENT DOCUMENTS

| | | | |
|---|---|---|---|
| DE | 44 38 972 C2 | 10/1994 | |
| DE | 196 52 181 A1 | 12/1996 | |
| JP | 2-5145 | 2/1990 | ........... F16H/25/22 |

* cited by examiner

Primary Examiner—Sherry Estremsky
Assistant Examiner—Tisha D. Lewis
(74) Attorney, Agent, or Firm—Sughrue Mion, PLLC

(57) ABSTRACT

A ball nut 30 has a dowel 60 for circulating balls 50. A cage type retainer 40 is disposed between a screw shaft 20 and the ball nut 30 which engages with the screw shaft 20 through the ball 50. The retainer 40 is provided with a plurality of elongated holes 42 at a peripheral surface thereof to extend to an axial direction thereof so as to separate the balls 50 from one another in a peripheral direction thereof and to hold the balls therein to be free to roll. The distance of a space between the screw shaft 20 and the cage type retainer 40 is set to be smaller than that of a space between the dowel 60 and the cage type retainer 40 n the radial direction of the screw shaft.

8 Claims, 7 Drawing Sheets

B<A

BALL SCREW

BACKGROUND OF THE INVENTION

1. Field of the Invention

The present invention relates to the improvement of a ball screw, particularly a ball screw with a cage type retainer.

2. Background of the Related Art

In a usual ball screw having no retainer shown in FIG. 10, for example, balls 50 are disposed at a high density in a state that balls contact one another within the ball screw grooves 22 of a screw shaft 20, within the ball screw grooves 32 of a ball nut 30, and within the ball circulation path 62 of a circulation dowel 60. When the respective balls roll, the adjacent balls rotate to the opposite direction to each other at the contact portions thereof. Thus, since the adjacent balls slip at the contact portions thereof, the balls are prevented from rolling freely due to the so-called rolling conflict phenomenon, whereby the torque resistance becomes large and so there arises torque fluctuation. Such torque fluctuation due to the rolling conflict phenomenon among the balls generally deteriorates in a low speed operation and an oscillation or swinging operation. Accordingly, the torque fluctuation due to the rolling conflict phenomenon becomes a problem to be solved in particular when the ball screw is used in an electric discharge machine or a wire cutting machine which a low speed and oscillating operation is required, for example. Further, the torque fluctuation due to the rolling conflict phenomenon must be suppressed since is becomes a cause of disturbance of motor control in a machining center in which the contour controllability is considered to be important.

As the countermeasure of such torque fluctuation due to the rolling conflict phenomenon, it is required to prevent the direct contact among the balls to eliminate the rolling conflict phenomenon thereby to improve the torque efficiency. For example, the ball screw using such a ball retainer H shown in FIG. 11 has been known as the countermeasure of the torque fluctuation due to the rolling conflict phenomenon. Such a retainer H is formed by a cylindrical portion H1 which is provided with a multiplicity of round holes H2 for holding balls so as to be free to roll therein. The balls are disposed within the round holes H2 so as to be free to roll therein, and the retainer H thus configured is attached between a screw shaft and a ball nut. According to such a retainer H, since the balls do not contact one another, the aforesaid torque fluctuation due to the slip resistance among the balls does not occur. However, when the retainer H is used in such a state that the screw shaft rotates at the predetermined position but the ball nut does not rotate, the retainer moves together with the ball nut toward the axial direction in accordance with the rotation of the screw shaft (in this case, an amount of the movement of the retainer is a half of that of the ball nut). Thus, when the moving stroke of the ball nut is large, the retainer H may come out of the spiral groove of the ball nut and then balls may come out of the ball screw.

In view of the aforesaid problem, a ball screw with a cage type retainer eliminating the aforesaid problem has been proposed in Japanese Utility Model Examined Publication No. Hei. 2-5145, for example. This ball screw is provided with a cage type retainer 40 which is loosely fitted between a screw shaft and a ball nut and is arranged in a manner that a multiplicity of elongated holes 42 each extending toward the axial direction are formed at a cylindrical body portion thereof with a thin thickness as shown in FIG. 12. Balls are disposed within the elongated holes 42 so as to be free to roll therein. The ball nut is provided with a ball circulation path 62 of the inner circulation type which is formed like the ball nut shown in FIG. 10 in a manner that a hole portion extending over the adjacent two of ball screw grooves 32 is formed in the ball nut and a ball circulation dowel 60 is fitted into the hole portion. The balls move toward the axial direction within the respective elongated holes 42 of the cage type retainer 40 while rolling along the ball screw grooves. When the balls pass the ball circulation path 62 of the ball circulation dowel 60, the balls move over the thread (land portion) of the screw shaft, and so the balls repeat the inner circulation. Each of the elongated holes 42 of the cage type retainer 40 is set to have such a length that the balls are movable toward the axial direction relative to the retainer so as not to interfere the internal circulation of the balls. Such a ball screw with a cage type retainer is advantageous in that the amount of the torque fluctuation is small and the moving stroke of the ball nut is not limited by the rolling balls.

However, the aforesaid ball screw with a cage type retainer has the following problems to be solved.

(1) The dowel 60 serving as a circulation part is generally designed to have such a size that the inner diameter side of the dowel protrudes to the inner diameter side of the ball nut so as to smoothly pick up the balls. Thus, the cage type retainer 40 disposed in the space between the screw shaft and the ball nut may interfere with the inner diameter side of the dowel 60 and so the retainer may not move smoothly relative to the ball nut.

(2) An electric discharge machine and a wire cutting machine which performs a processing operation at a low speed and oscillating operation is often driven at a high-speed feeding during a period other than the processing operation in order to improve the working efficiency. In the high-speed feeding operation, the balls circulating through the dowel 60 collide with the elongated holes 42 of the cage type retainer 40 thereby to form bruises at the retainer 40, so that the torque characteristics may be deteriorated due to the influence of the bruises.

(3) When the ball moves away from the retainer 40 and then the ball slips and moves over the surface of the land portion of the screw shaft within the ball circulation path 62 to the adjacent groove, the ball traces such a locus that the ball moves once outside of a ball circle diameter (hereinafter referring to BCD) due to the centrifugal force applied thereto and again returns on the BCD. Thus, when the ball returns to the cage type retainer 40, there may arise such phenomena that the ball collides with the cage type retainer 40 with a lager force or the ball is thrust between the nut and the retainer (thrusting phenomenon like a wedge).

SUMMARY OF THE INVENTION

Accordingly, the present invention has been performed in order to solve the aforesaid unsolved problem of the conventional ball screw with a cage type retainer.

In is an object of the present invention to provide a ball screw with a cage type retainer in which the relative size of the cage type retainer to the radial direction and the hardness of the retainer are adjusted so that the ball screw can prevent the occurrence of the interference between a retainer and a dowel, collision of a ball with the retainer, thrusting of the ball or the like thereby to improve the torque efficiency.

The above-mentioned object can be attained by a ball screw according to the present invention comprising:

a screw shaft including a first ball screw groove formed in an outer peripheral surface thereof and formed into a spiral shape;

a ball nut including a second ball screw groove formed in an inner peripheral surface thereof and opposing the first ball screw groove;

a plurality of balls rollingly fitted between the first and second ball screw for allowing the ball nut to move with respect to the screw shaft;

a dowel provided at a portion of the ball screw grooves of the ball nut so as to guide a ball to move over a thread of the screw shaft and to circulate along the first and second ball screw grooves, thereby to form a circulation path; and a cylindrical retainer separately disposed between the screw shaft and the ball nut in a radial direction of the screw shaft, and provided with a plurality of elongated holes extending in an axial direction thereof at its peripheral surface for separating the balls from one another in a circumferential direction thereof and for rollingably holding the balls therein, wherein a distance defined between the screw shaft and the retainer is smaller than a distance defined between the dowel and the retainer in the radial direction.

In the aforementioned ball screw, it is advantageous that the retainer has a hardness in a range of HRC 22–HRC 67.

Further, in the aforementioned ball screw, it is advantageous that the retainer is made of a magnetized material.

DETAILED DESCRIPTION OF THE PREFERRED EMBODIMENTS

The embodiments of the present invention will be described with reference to the accompanying drawings.

Figure 1:
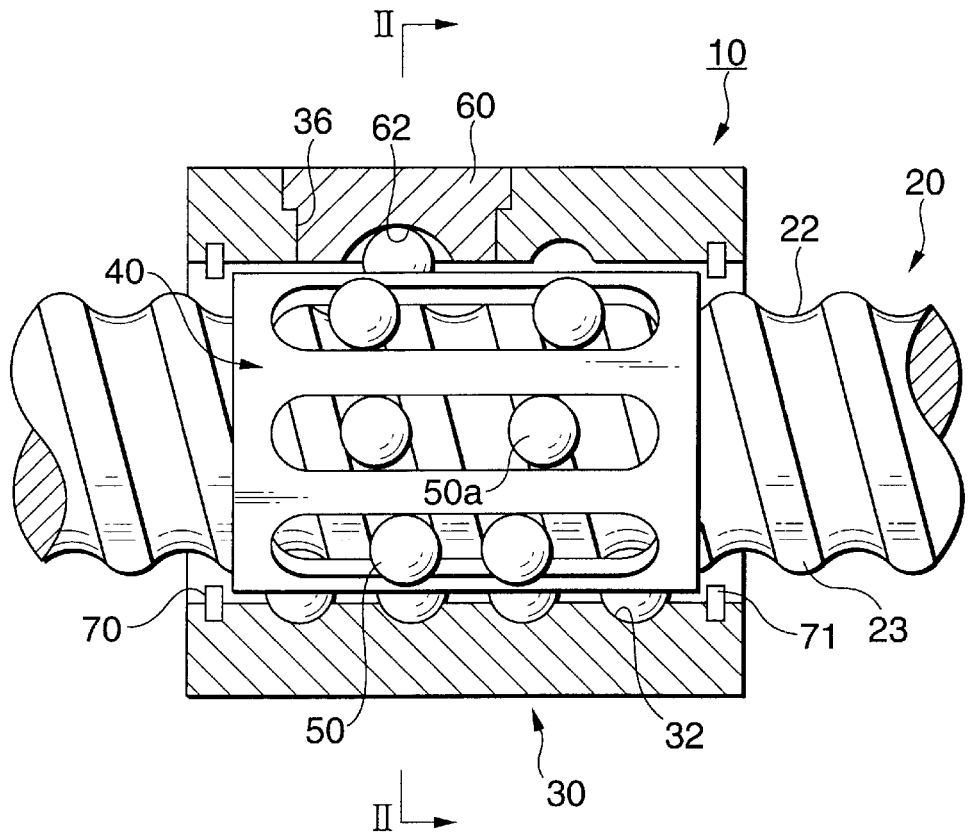
FIG. 1 is a front sectional view of the ball screw with a cage type retainer according to an embodiment of the present invention.
Figure 2:
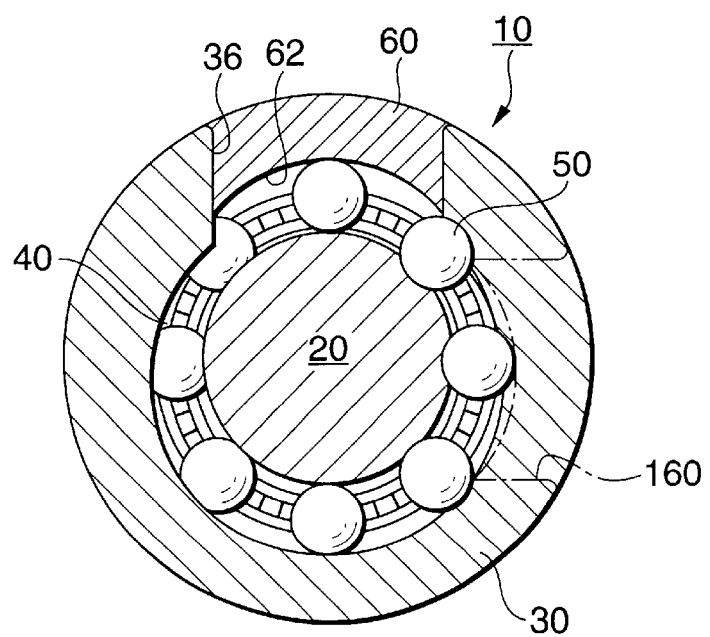
FIG. 2 is a sectional view of the ball screw with a cage type retainer taken away along a line II—II in FIG. 1.
Figure 3:
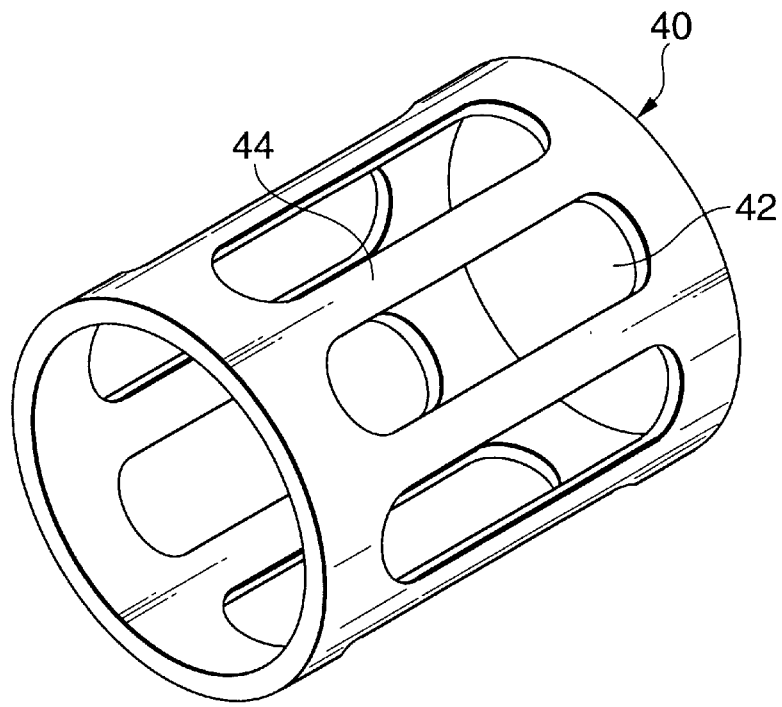
FIG. 3 is a perspective view of a retainer of the embodiment.
Figure 4:
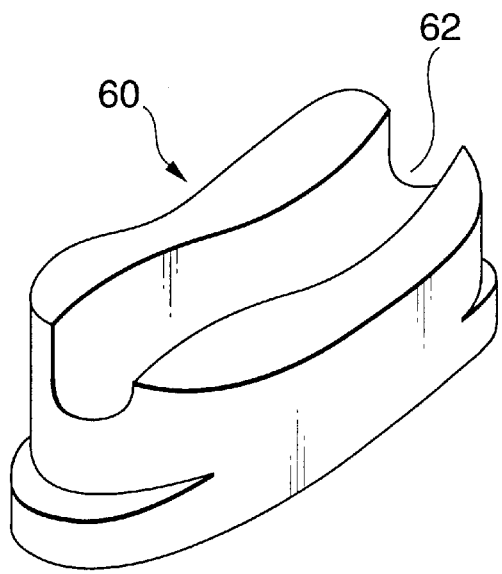
FIG. 4 is a perspective view of a dowel for circulation of the embodiment.
Figure 5:
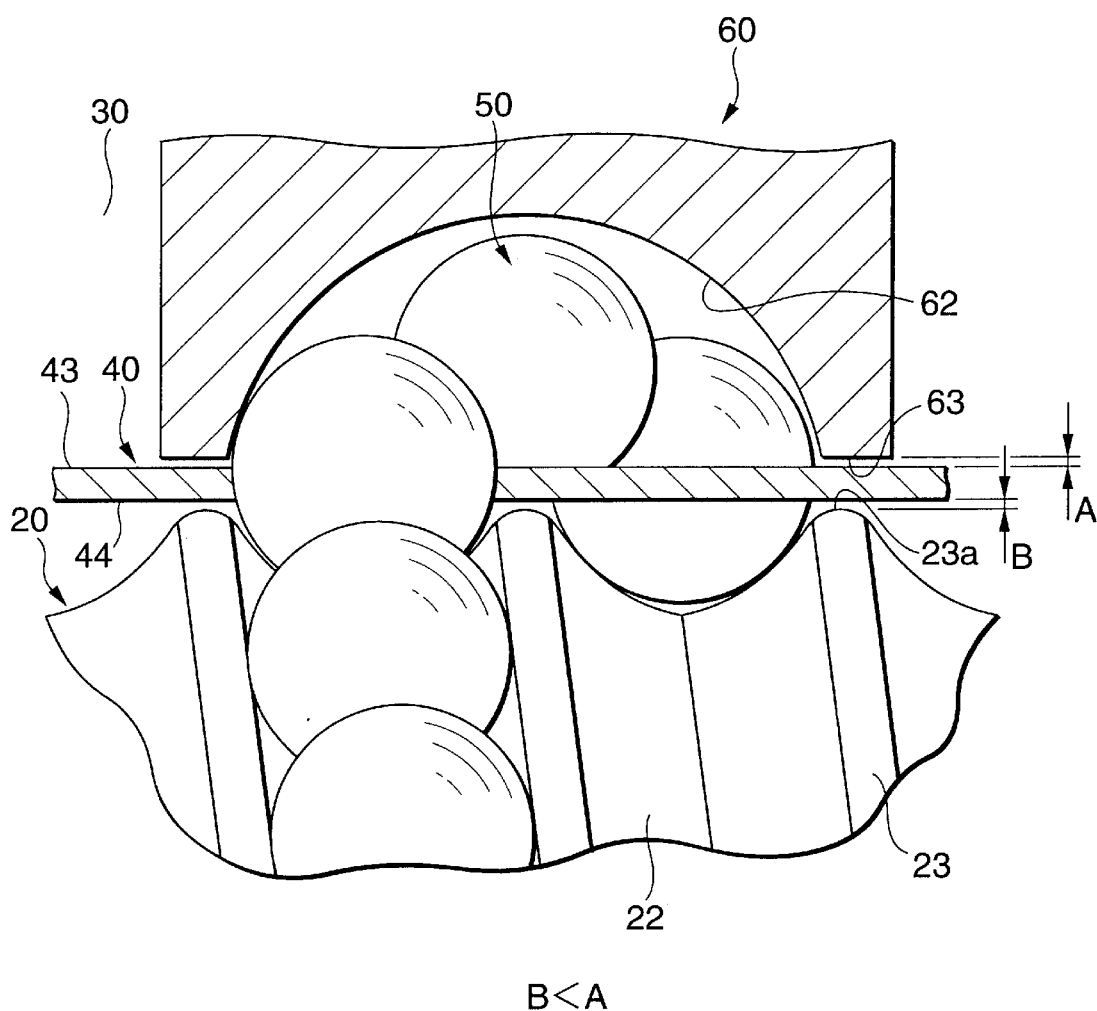
FIG. 5 is an enlarged sectional view of the main portion of the ball screw with a cage type retainer according to the embodiment used for explaining the relation between a space among the retainer, the dowel and a screw shaft.
Figure 6:
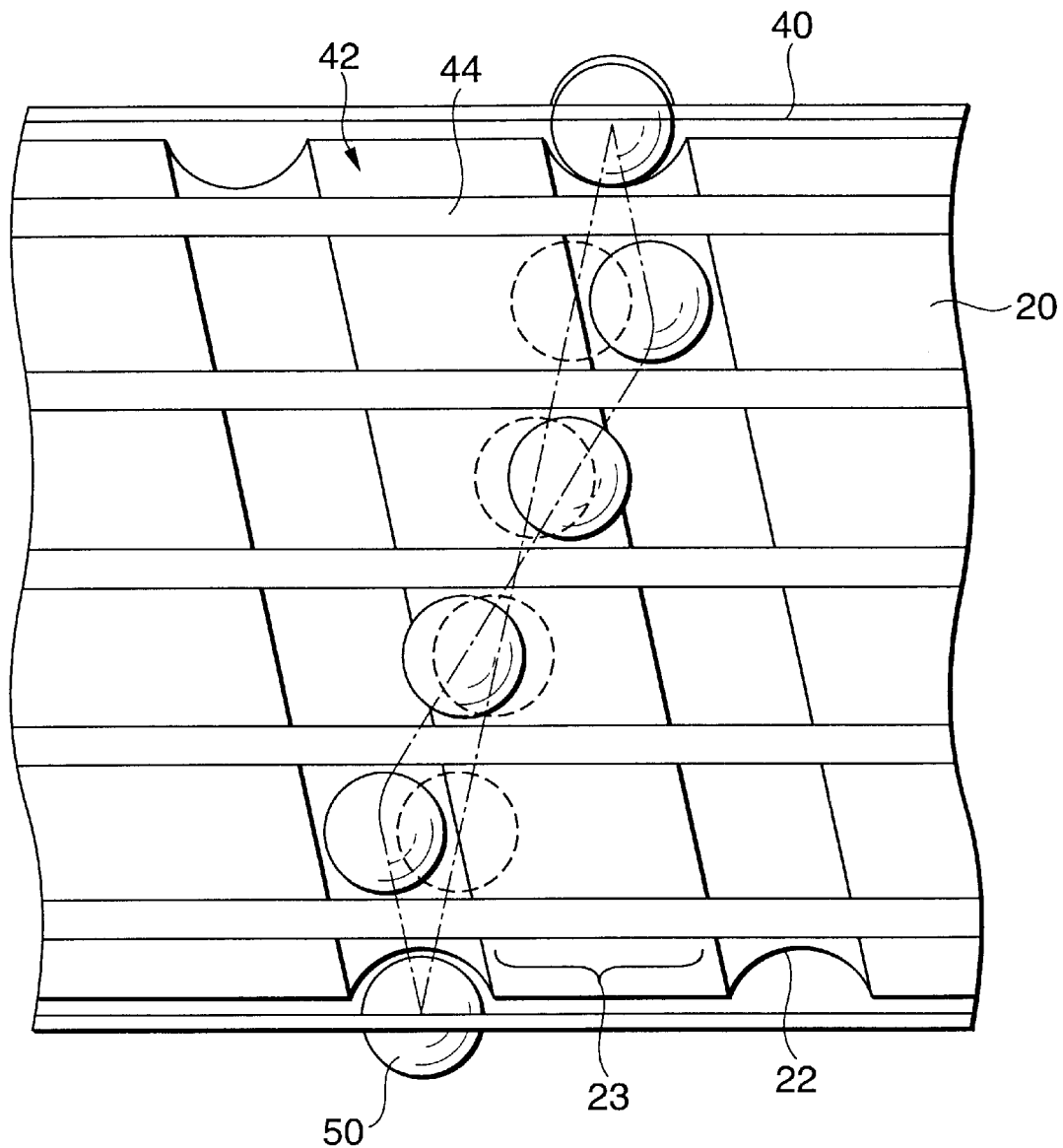
FIG. 6 is a schematic front sectional view of the main portion of the ball screw with a cage type retainer according to another embodiment of the present invention used for explaining the retainer and the locus of a ball.
Figure 7:
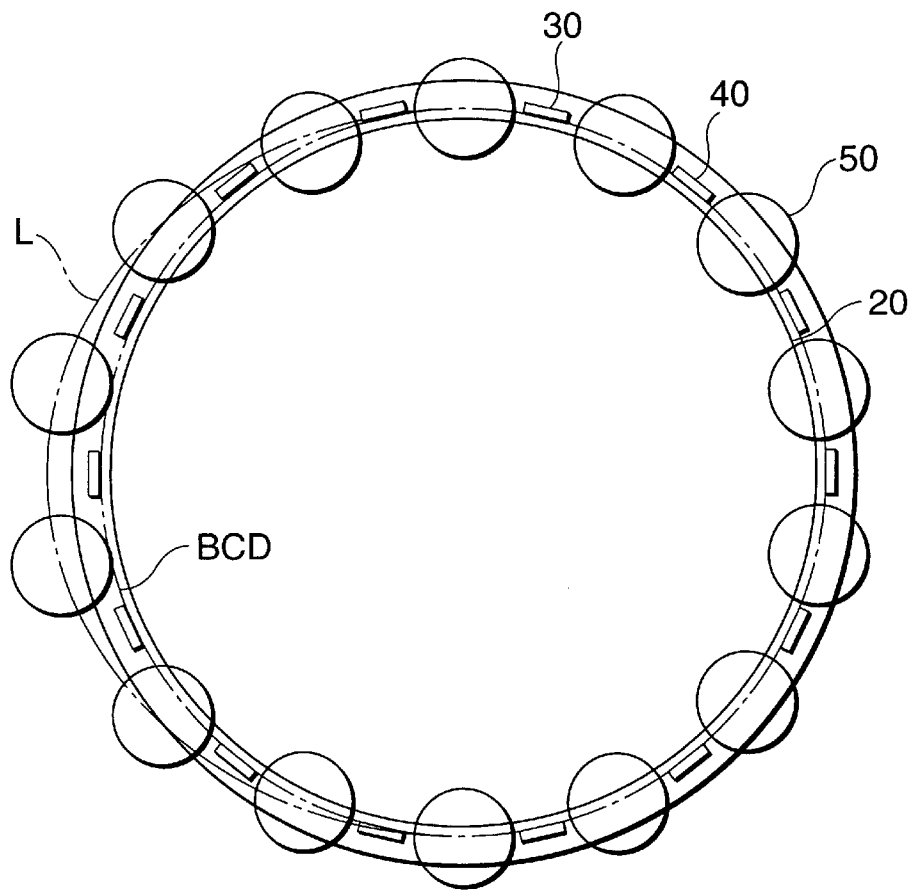
FIG. 7 is a schematic sectional view of the main portion of the ball screw with a cage type retainer according to the another embodiment seen from the sectional area perpendicular to the axis thereof.

FIGS. 1 to 5 are diagrams showing a ball screw with a cage type retainer according to an embodiment of the present invention. FIG. 1 is a front sectional view of the ball screw with a cage type retainer according to the embodiment, FIG. 2 is a sectional view of the ball screw with a cage type retainer cut away along a line II—II in FIG. 1, FIG. 3 is a perspective view of the retainer of the embodiment, FIG. 4 is a perspective view of a dowel for circulation of the embodiment, and FIG. 5 is an enlarged sectional view of the main portion of the ball screw with a cage type retainer according to the embodiment.

At first, the configuration of the ball screw with a cage type retainer according to the embodiment will be explained.

A ball screw 10 includes a screw shaft 20 provided with ball screw grooves 22 of spiral shape formed on the outer periphery thereof, a ball nut 30 provided with ball screw grooves 32 of spiral shape formed on the inner periphery thereof in correspondence with the ball screw grooves 22, a cage type retainer 40 (hereinafter merely called a retainer) of a cylindrical shape with a thin thickness which is disposed at the space between the screw shaft 20 and the ball nut 30, a multiplicity of balls 50 which are disposed between the ball screw grooves 22 of the screw shaft 20 and the ball screw grooves 32 of the ball nut 30 opposing thereto and are loosely fitted into the elongated holes 42 of the retainer, and dowels 60 each engaged with a through hole 36 provided in the ball nut 30.

As shown in FIG. 3, the retainer 40 is formed in a cylindrical shape with a thin thickness and provided with a plurality of the elongated holes 42 each of which is formed on the peripheral surface thereof to extend to the axial direction and penetrate from the outer periphery to the inner periphery thereof. The retainer 40 is further provided with pillar shaped portions 44 formed between the adjacent elongated holes 42. The balls 50 are placed within the ball screw grooves 22, 32 of the screw shaft 20 and the ball nut 30, and further separated from one another so as to be free to roll when fitted into the elongated holes 42 of the retainer 40. As shown in FIG. 4, the dowel 60 has such a configuration that he dowel fits into the through hole 36 which is formed at the body portion of the ball nut 30 so as to cross over the adjacent two ball screw grooves 32 of the ball nut 30. The dowel 60 is provided with a ball circulation path 62 with a large depth formed on the inner periphery thereof which allow the balls 50 to move over the thread between the ball screw grooves 22 of the screw shaft 20. In addition to the dowel 60 for a left side ball circuit shown in FIG. 1, another dowel 160 is provided for a right side ball circuit, as shown in FIG. 2. The dowel 160 for the right side ball circuit is disposed at a position different in phase of just 90° from the left side ball circuit. FIG. 1 shows a state where one ball 50a passing through the right side dowel just moves over the thread of the screw shaft. Stop rings 70, 71 are provided at the inner peripheral surface of the ball nut 30 so that the retainer 40 can rotate relatively with respect to the ball nut 30 but can not move to the axial direction.

As shown in FIG. 5, the retainer 40 disposed in the space between the screw shaft 20 and the ball nut 30 has a space with a distance A between the outer diameter surface 43 of the retainer and the inner diameter surface 63 of the dowel 60 and further has a space with a distance B between the inner diameter surface 41 of the retainer and the outer diameter surface 23a of the thread of the land portion 23 of the screw shaft 20. The distances A and B of these spaces are set to satisfy the relation of A>B.

The operation of the ball screw with a cage type retainer according to the embodiment will be explained.

First, the ball nut 30 is supported in a manner that it can not be rotated but is movable to the axial direction, and then the screw shaft 20 which can not move to the axial direction is rotated clockwise when seen from the right side in FIG. 1. Then, the multiplicity of balls 50 fitted into the ball screw grooves 22 of the screw shaft 20 and the ball screw grooves 32 of the ball nut 30 roll along the ball screw grooves 22, and the ball nut 30 moves to the axial direction, that is, the right direction in FIG. 1 by the length corresponding to the stroke proportional to the rotation amount of the screw shaft 20. In this case, although the balls 50 roll along the ball screw grooves 22, 32, the retainer 40 rotates in accordance with the rolling of the balls 50 since the retainer is rotatably supported by the ball nut 30 by means of the stop rings 70, 71. Then, the ball 50 moves to the axial direction within the elongated hole 42 of the retainer 40 by a distance corresponding to almost the lead of the screw. Then, the ball 50 having moved to the front end side (left end side in FIG. 1) of the retainer 40 is pushed by the pillar shaped portion 44 of the retainer 40 thereby to move over the land portion 23 of the thread of the screw shaft 20 while being guided along the ball circulation path 62 of the dowel 60 and be returned within the adjacent ball screw groove 22 (the right side groove in FIG. 1). During the circulating operation of the balls, the respective balls 50 within the ball screw grooves 22 and 32 do not contact one another since they are separated one another by the elongated holes 42 of the retainer 40. Thus, the rotation of the screw shaft 20 and the axial movement of the ball nut 30 based on the rotation of the screw shaft 20 are performed quite smoothly and so the torque fluctuation occurs scarcely. Further, since the retainer 40 does not move to the axial direction with respect to the ball nut 30 although the balls 50 circulate along the outer periphery of the screw shaft 20, the moving stroke of the ball nut 30 is not limited by the rolling of the balls and so the ball nut can be used when the moving stroke is large.

Further, according to the embodiment, the distance A of the space between the outer diameter surface 43 of the retainer 40 and the inner diameter surface 63 of the dowel 60 fixed to the ball nut 30 is set to be larger than the distance B of the space between the inner diameter surface 41 of the retainer 40 and the outer diameter surface 23a of the thread of the screw shaft 20, that is, A>B. Thus, even if the retainer 40 vibrates during its rotation, the retainer 40 does not contact with the dowel 60 because the retainer 40 contacts with the screw shaft 20 before the retainer 40 contacts with the dowel 60. Accordingly, there is no possibility that the retainer 40 is caught by the dowel 60. The outer diameter surface 23a of the thread of the screw shaft 20 is ground so as to be smooth since it is generally used as a reference surface. Thus, there arises no problem even if the screw shaft 20 contacts with the retainer 40. In this manner, since torque fluctuation does not occur in the ball screw, the ball screw can be operated more stably and smoothly.

The ball screw of a cage type retainer according to another embodiment of the present invention will be explained with reference to FIG. 1.

In this embodiment, the retainer 40 made of steel is fabricated by using a material which hardness is larger than the hardness (HRC 22–30) of a general thermal refining material (in other word, a quenching and tempering material) and smaller than the hardness (HRC 62–67) of the ball 50 made of steel in such a manner that the retainer and the balls do not scrape to each other. That is, the hardness of the retainer is restricted into a range of HRC 22–67. Since the range of the hardness of the retainer 40 is restricted in this manner, even if the balls collide with the retainer 40 strongly at the time of feeding the ball nut 30 at a high speed by rotating the screw shaft 20 at a high speed, no bruise is formed at the retainer 40. Accordingly, the durability of the retainer 40 can be ensured at the high speed feeding of the ball nut and further the torque characteristics of the ball screw can be improved.

However, since the hardness of the retainer is varied within the restricted range of HRC 22–67 in accordance with a rotation speed of the screw shaft 20, it is preferable that an actual hardness of the retainer 40 is determined on the basis of an actual rotational speed of the screw shaft 20. One example of determination regarding the restricted range of the hardness of the retainer 40 will be hereinafter described.

That is, according to the result of the experiment using the retainer 40 made of steel fabricated by the thermal refining material with the hardness of HRC 22–30 under the predetermined rotation speed of the screw shaft 20, the bruises were formed at the retainer. In contrast, according to the result of the experiment using the quenched retainer with the hardness of about HRC 50, no bruise was formed at the retainer 40. In addition, the balls are not scraped/damaged as long as the hardness of the retainer does not exceed the hardness HRC 62–67 of the balls. Therefore, in this case, it is preferable to restrict the hardness of the retainer into a range of HRC 50–62.

Other configuration, operation and effect of this embodiment is same as the aforesaid first embodiment.

The ball screw of a cage type retainer according to a still another embodiment of the present invention will be explained with reference to FIGS. 6 to 9.

This embodiment differs from the first embodiment in a point that the retainer 40 is fabricated by the magnetized material. The following materials may be raised for example as the magnetized material, that is, ① quenched magnet (KS magnetic steel), ② powder type magnet such as sintered material of alnico system magnetic powder, ferrite magnet using metal oxide powder or the like, ③ plastic magnet formed by mixing ferrite powder with flexible plastic, ④ alloy with a high magnetic permeability such as silicon steel, permalloy alloy or the like, and ⑤ amorphous alloy such as Co system or the like.

Figure 8:
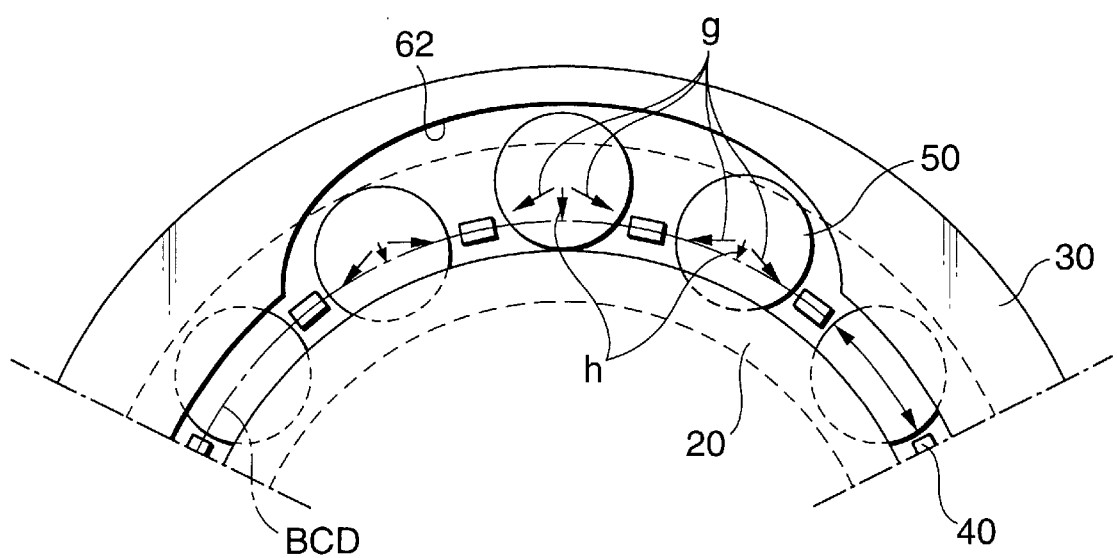
FIG. 8 is a schematic sectional view of the main portion of the ball screw with a cage type retainer according to still another embodiment of the present invention used for explaining the operation of the retainer thereof.
Figure 9:
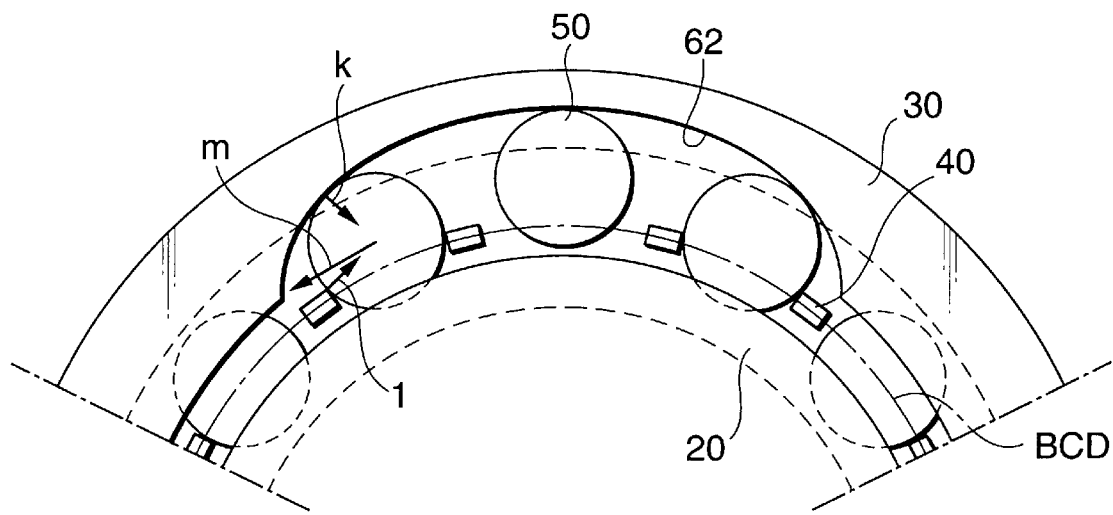
FIG. 9 is a schematic sectional view of the main portion of the conventional ball screw with a cage type retainer used for explaining the operation of the retainer thereof.
Figure 10:
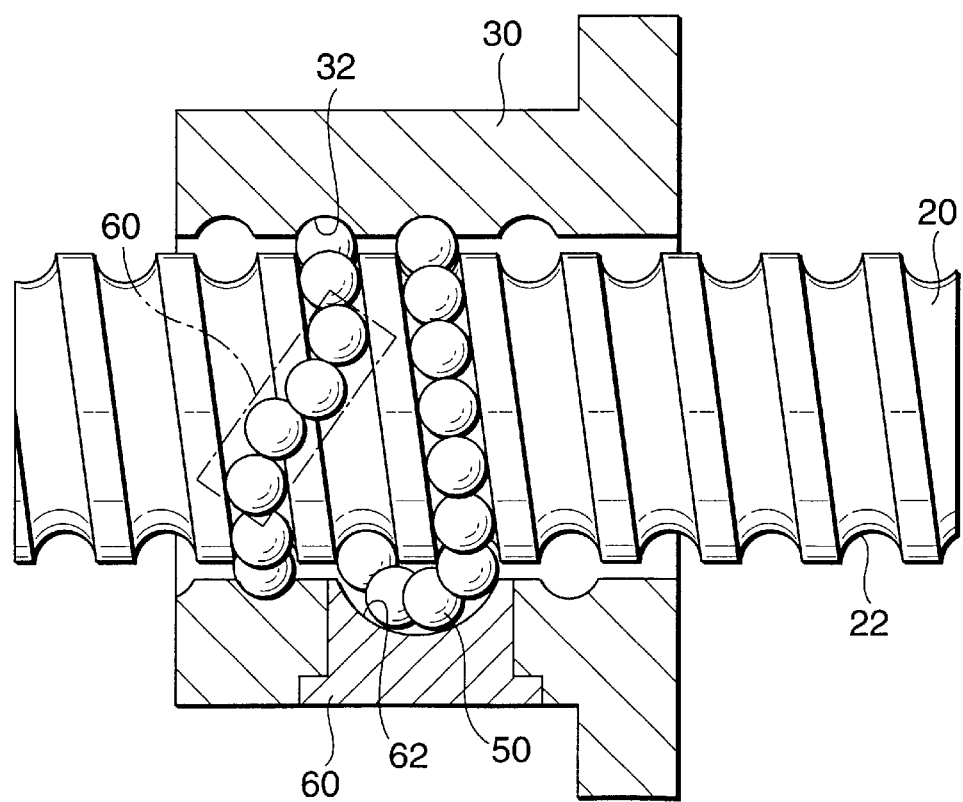
FIG. 10 is a front sectional view of a conventional ball screw having no retainer.
Figure 11:
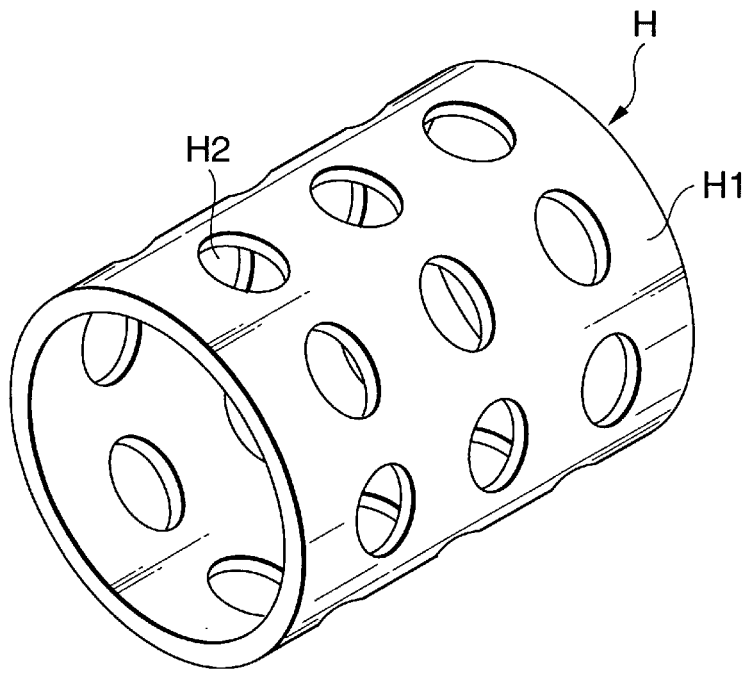
FIG. 11 is a perspective view of a conventional retainer provided with holes.
Figure 12:
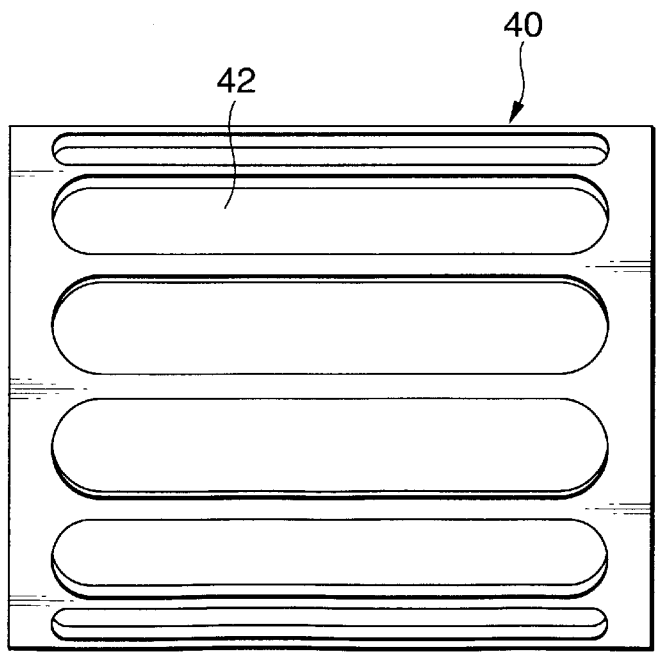
FIG. 12 is a front view of a conventional cage type retainer.

The operation of this embodiment will be explained with reference to FIG. 8 in comparison with the case where the retainer is formed by non-magnetized material (FIG. 9). In general, in the case where the retainer is formed by non-magnetized material (FIG. 9) in the ball screw with a cage type retainer of a dowel circulation type, when the balls 50 move to the next groove through the ball circulation path 62 of the dowel while sliding on the surface of the screw shaft 20 within the ball nut 30, the respective balls 50 are pressed against the inner wall of the ball circulation path 62 due to the centrifugal force applied thereto when seen the balls 50 from the axial direction, as shown in FIG. 9. As a result, the locus of the ball once moves away from the BCD to bend toward the outside (see a line L in FIG. 7). Then, when the balls have passed the ball circulation path 62, the balls again moves on the BCD. When the balls return to the elongated holes 42 of the retainer 40, the balls collide with the retainer strongly to bruise the retainer. Alternately, as shown in FIG. 9, the ball 50 moving to the direction shown by an arrow m collides with the wall surface of the end portion of the ball circulation path 62 to receive resilience to the direction shown by an arrow k and also collides with the retainer 40 to receive resilience to the direction shown by an arrow 1, so that the ball 50 hardly returns on the BCD.

In contrast, in the case of the present embodiment (FIG. 8), when the ball 50 having moved on the BCD passes the ball circulation path 62, the ball is applied with centrifugal force and further attracted to the direction shown by an arrow g against the centrifugal force due to the magnetic force of the retainer 40. If the magnetic force is larger than the centrifugal force, the ball 50 moves to the direction shown by an arrow h, that is, toward the BCD. Thus, when the ball returns to the elongated hole 42 of the retainer 40, it can be prevented that the ball collides with the retainer strongly to bruise the retainer. Further, such a phenomenon can be prevented from occurring that the ball collides with the wall surface of the end portion of the ball circulation path 62 or the retainer 40 to receive strong resilience or is thrust like a wedge, so that the ball screw can be operated smoothly.

The ball screw with a cage type retainer according to the present invention may be formed by combining any two or all of the aforesaid three embodiments.

In the cage type retainer 40 in each of the aforesaid embodiments, the length of each of the plurality of elongated holes 42 is made long to extend from the one end side to the other end side of the retainer. However, when the adjacent ball circuits are separated sufficiently to each other, each of the elongated holes 42 may be divided into plural pieces (for example, two) along the axial direction in accordance with an amount of movement of the ball 50 to the axial direction in the respective ball circuits. When the elongated holes 42 are divided along the axial direction in this manner, the adjacent elongated holes to the axial direction may be arranged in a checked pattern.

As described above, according to the ball screw with a cage type retainer according to the present invention, since a distance defined between the screw shaft and the retainer is smaller than a distance defined between the dowel and the retainer in the radial direction of the screw shaft, such a phenomenon can be prevented from occurring that the retainer and the dowel interfere to each other and so the retainer does not move smoothly relative to the ball nut. As a result, the torque efficiency of the ball screw with a cage type retainer can be further improved.

According to the the ball screw with a cage type retainer according to the present invention, since the retainer has a hardness in a range of HRC 22–HRC 67, such a phenomenon can be prevented from occurring that, at the time of operating the ball screw with a cage type retainer at a high speed feeding, the balls circulating through the dowel collide with the elongated holes of the cage type retainer strongly to form bruises at the retainer and hence the torque characteristics is deteriorated due to the bruises. As a result, the torque efficiency of the ball screw with a cage type retainer can be furthermore improved.

According to the the ball screw with a cage type retainer according to the present invention, since the retainer is made of a magnetized material, such a phenomenon can be prevented from occurring that, when the ball moves away from the retainer and moves outside of the BCD within the circulation path of the circulation dowel and thereafter returns again to the retainer, the ball collides with the retainer with a large force or is thrust between the nut and the retainer. As a result, the torque efficiency of the ball screw with a cage type retainer can be furthermore improved.

The present invention is based on Japanese Patent Application No. Hei. 10-184452, which is incorporated herein by reference.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A ball screw comprising:

a screw shaft including a first ball screw groove formed in an outer peripheral surface thereof and formed into a spiral shape, said outer peripheral surface being smoothly grounded;

a ball nut including a second ball screw groove formed in an inner peripheral surface thereof and opposing said first ball screw groove;

a plurality of balls rollingably fitted between the first and second ball screw grooves for allowing the ball nut to move with respect to the screw shaft;

a dowel provided at a portion of said first and second ball screw grooves of said ball nut so as to guide a ball to move over a thread of said screw shaft and to circulate along said first and second ball screw grooves, thereby to form a circulation path; and a cylindrical retainer separately disposed between said screw shaft and said ball nut in a radial direction of said screw shaft, and provided with a plurality of elongated holes extending in an axial direction thereof at its peripheral surface for separating said balls from one another in a circumferential direction thereof and for rollingably holding said balls therein, wherein a distance defined between said screw shaft and said retainer is smaller than a distance defined between said dowel and said retainer in said radial direction.

2. A ball screw according to claim 1, wherein said retainer has a hardness in a range of HRC 22–HRC 67.

3. A ball screw comprising:

a screw shaft including a first ball screw groove formed in an outer peripheral surface thereof and formed into a spiral shape;

a ball nut including a second ball screw groove formed in an inner peripheral surface thereof and opposing said first ball screw groove;

a plurality of balls rollingably fitted between the first and second ball screw grooves for allowing the ball nut to move with respect to the screw shaft;

a dowel provided at a portion of said first and second ball screw grooves of said ball nut so as to guide a ball to move over a thread of said screw shaft and to circulate along said first and second ball screw grooves, thereby to form a circulation path; and a cylindrical retainer separately disposed between said screw shaft and said ball nut in a radial direction of said screw shaft, and provided with a plurality of elongated holes extending in an axial direction thereof at its peripheral surface for separating said balls from one another in a circumferential direction thereof and for rollingably holding said balls therein, wherein a distance defined between said screw shaft and said retainer is smaller than a distance defined between said dowel and said retainer in said radial direction, wherein each of said ball has a hardness in a range of HRC 62–HRC 67.

4. A ball screw comprising:

a screw shaft including a first ball screw groove formed in an outer peripheral surface thereof and formed into a spiral shape;

a ball nut including a second ball screw groove formed in an inner peripheral surface thereof and opposing said first ball screw groove;

a plurality of balls rollingably fitted between the first and second ball screw grooves for allowing the ball nut to move with respect to the screw shaft;

a dowel provided at a portion of said first and second ball screw grooves of said ball nut so as to guide a ball to move over a thread of said screw shaft and to circulate along said first and second ball screw grooves, thereby to form a circulation path; and a cylindrical retainer separately disposed between said screw shaft and said ball nut in a radial direction of said screw shaft, and provided with a plurality of elongated holes extending in an axial direction thereof at its peripheral surface for separating said balls from one another in a circumferential direction thereof and for rollingably holding said balls therein, wherein a distance defined between said screw shaft and said retainer is smaller than a distance defined between said dowel and said retainer in said radial direction, wherein said retainer is made of magnetized material.

5. A ball screw comprising:

a screw shaft including a first ball screw groove formed in an outer peripheral surface there of and formed into a spiral shape;

a ball nut including a second ball screw groove formed in an inner peripheral surface thereof and opposing said first ball screw groove;

a plurality of balls rollingably fitted between the first and second ball screw grooves for allowing the ball nut to move with respect to the screw shaft;

a dowel provided at a portion of said first and second ball screw grooves of said ball nut so as to guide a ball to move over a thread of said screw shaft and to circulate along said first and second ball screw grooves, thereby to form a circulation path; and a cylindrical retainer separately disposed between said screw shaft and said ball nut in a radial direction of said screw shaft, and provided with a plurality of elongated holes extending in an axial direction thereof at its peripheral surface for separating said balls from one another in a circumferential direction thereof and for rollingably holding said balls therein, wherein a distance defined between said screw shaft and said retainer is smaller than a distance defined between said dowel and said retainer in said radial direction, wherein said retainer has a hardness in a range of HRC 22–HRC 67, wherein said retainer is made of magnetized material.

6. A ball screw with a cage type retainer according to claim 3, wherein said retainer is made of a magnetized material.

7. A ball screw comprising:

a screw shaft including a first ball screw groove formed in an outer peripheral surface thereof and formed into a spiral shape;

a ball nut including a second ball screw groove formed in an inner peripheral surface thereof and opposing said first ball screw groove;

a plurality of balls rollingably fitted between the first and second ball screw grooves for allowing the ball nut to move with respect to the screw shaft;

a dowel provided at a portion of said first and second ball screw grooves of said ball nut so as to guide a ball to move over a thread of said screw shaft and to circulate along said first and second ball screw grooves, thereby to form a circulation path; and a cylindrical retainer separately disposed between said screw shaft and said ball nut in a radial direction of said screw shaft, and provided with a plurality of elongated holes extending in an axial direction thereof at its peripheral surface for separating said balls from one another in a circumferential direction thereof and for rollingably holding said balls therein, wherein a distance defined between said screw shaft and said retainer is smaller than a distance defined between said dowel and said retainer in said radial direction, wherein said retainer is made of a material which hardness is larger than a hardness of thermal refining material and smaller than a hardness of said ball.

8. A ball screw comprising:

a screw shaft including a first ball screw groove formed in an outer peripheral surface there of and formed into a spiral shape;

a ball nut including a second ball screw groove formed in an inner peripheral surface thereof and opposing said first ball screw groove;

a plurality of balls rollingably fitted between the first and second ball screw grooves for allowing the ball nut to move with respect to the screw shaft;

a dowel provided at a portion of said first and second ball screw grooves of said ball nut so as to guide a ball to move over a thread of said screw shaft and to circulate along said first and second ball screw grooves, thereby to form a circulation path; and a cylindrical retainer separately disposed between said screw shaft and said ball nut in a radial direction of said screw shaft, and provided with a plurality of elongated holes extending in an axial direction thereof at its peripheral surface for separating said balls from one another in a circumferential direction thereof and for rollingably holding said balls therein, wherein a distance defined between said screw shaft and said retainer is smaller than a distance defined between said dowel and said retainer in said radial direction, wherein said retainer has a hardness in a range of HRC 50–HRC 62.

\* \* \* \* \*